J. LANG.
VALVE FOR IRRIGATING SYSTEMS.
APPLICATION FILED JUNE 2, 1909.

946,516.

Patented Jan. 11, 1910.
2 SHEETS—SHEET 1.

WITNESSES
E. W. Callaghan
Amos W. Hart

INVENTOR
Jake Lang
BY Munn & Co.
ATTORNEYS

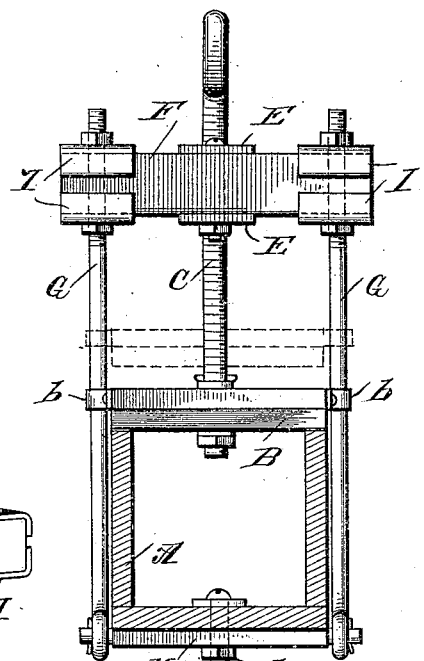
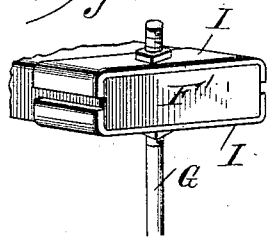
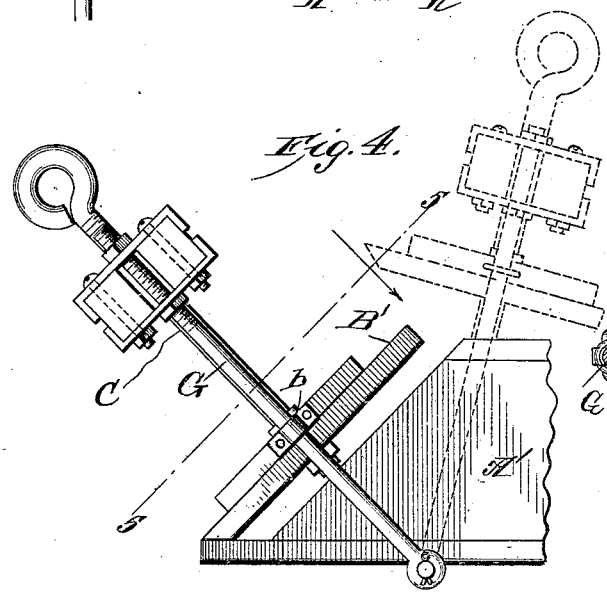
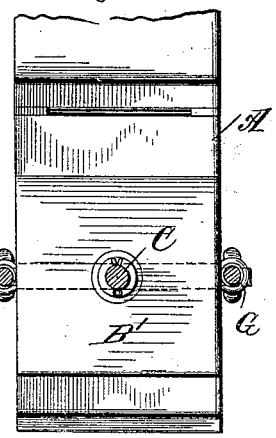
J. LANG.
VALVE FOR IRRIGATING SYSTEMS.
APPLICATION FILED JUNE 2, 1909.
946,516.
Patented Jan. 11, 1910.
2 SHEETS—SHEET 2.
WITNESSES
E. M. Callaghan
Amos W. Hart
INVENTOR
JAKE LANG
BY Munn & Co.
ATTORNEYS

UNITED STATES PATENT OFFICE.

JAKE LANG, OF CLEARMONT, WYOMING.

VALVE FOR IRRIGATING SYSTEMS.

946,516.  Specification of Letters Patent.  Patented Jan. 11, 1910.

Application filed June 2, 1909. Serial No. 499,759.

*To all whom it may concern:*

Be it known that I, JAKE LANG, a citizen of the United States, residing at Clearmont, Sheridan county, State of Wyoming, have invented an Improvement in Valves for Irrigation Systems, of which the following is a specification.

In irrigation systems, water is conducted from a main ditch into laterals by which it is distributed upon the land to be irrigated.

The purpose of my improved valve is to control delivery of water into the laterals. It is so constructed that the valve proper may be raised so as to allow a restricted, or free, flow of water into a lateral.

A special feature of the invention is the adaptation of the valve not only for vertical adjustment, which is effected by means of a screw shaft, but also to be swung laterally, when it is required to uncover the water inlet or opening to the fullest extent.

The details of construction, arrangement, and operation of parts are as hereinafter described, and illustrated in the accompanying drawing in which—

Figure 1:
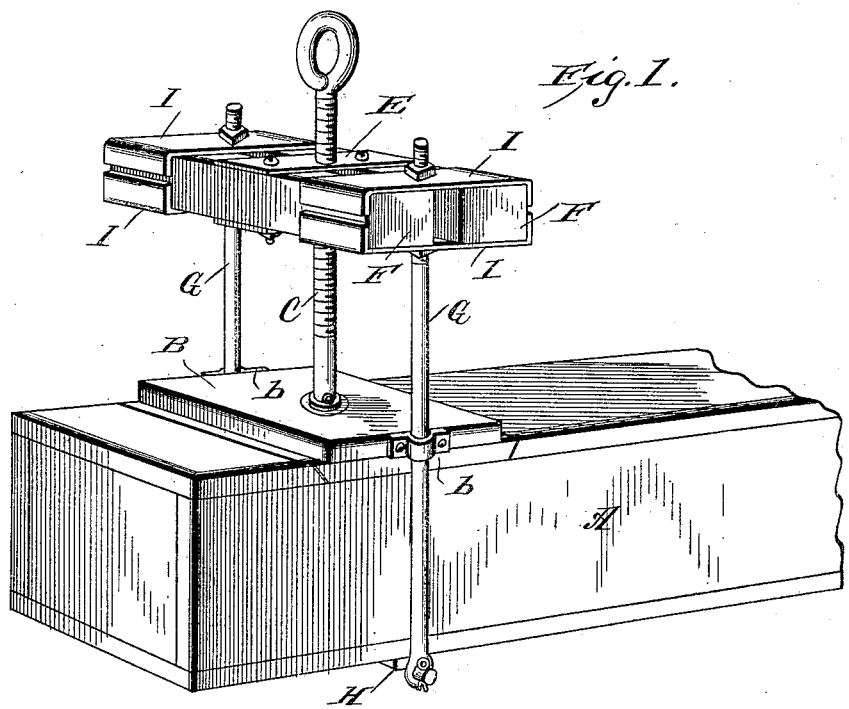
Figure 2:
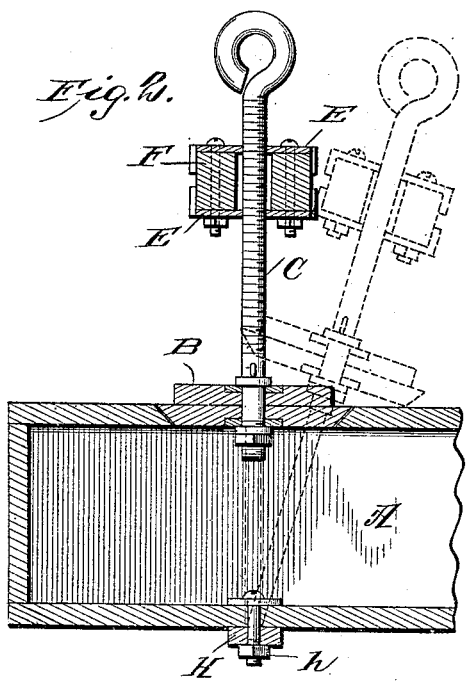

Figure 1 is a perspective view of one form of my invention. Fig. 2 is a longitudinal vertical section of the same. Fig. 3 is a vertical cross section. Fig. 4 is a side view illustrating a modification. Fig. 5 is a cross section on the line 5—5 of Fig. 4. Fig. 6 shows another modification.

I will first describe the invention illustrated in Figs. 1, 2, 3. A indicates a box-like tube or water-conductor which is closed at one end, and which, in practice, is arranged in the main irrigating ditch and extends therefrom to a lateral. These tubes, provided with my improved valve attachment, are located along the main ditch, small channels being cut to accommodate them. They are ordinarily placed from five to ten, or even twenty or thirty rods apart, according to conditions, the chief of which are the slope of the land below the ditch, and the difference in soil and crops. The conductors A may be very cheaply constructed of rough lumber. In the upper side, near the closed end, there is provided an opening into which the valve proper B is fitted. The sides of the openings are beveled and the valve has a corresponding form so that it is self-seating when forced down. For the purpose of adjusting the valve to allow entrance of water into the conductor A, I employ a screw-shaft C which is rotatably connected to the valve and provided at its upper end with an eye to receive some form of lever for rotating the screw. The screw C passes through plates E, which are practically nuts, the same being secured to two wooden bars F arranged parallel but spaced apart sufficiently to receive the screw between them. These bars are supported upon rods G arranged parallel on opposite sides of the tube or conductor A, and pivoted on a cross-bar H—see Fig. 3—which is secured by a screw-bolt $h$ to the bottom of the tube. The valve proper B is also provided with lateral eyes $b$ through which the rods G pass, so that the latter serve as guides for the valve. The upper ends of the rods G pass through angular clamping plates I, which are applied to the ends of the wooden bars F, the rods being screw-threaded and nuts being applied thereto above and below the clamps I. The attachment composed of the nuts E, bars F, F, and clamps I, is thus held rigidly supported upon and connecting the rods G. It is obvious that, by rotating the screw-shaft C, the valve may be raised from its seat, or held firmly on the same, as required to allow a flow of water into the tube A, or to entirely cut off the same. Thus the aforesaid attachment on the rods G will hold the valve proper B supported directly above the opening in the conductor A, or, when the valve is adjusted high enough, it may be swung over laterally, as indicated by dotted lines Fig. 2, so as to allow a very free inlet of water, or, in other words, to leave the opening of the conductor A practically unobstructed. The screw-shaft, with its eye, constitutes a means for easily and quickly adjusting the valve proper as conditions require, and holds the valve securely in any position to which it may be adjusted. The whole attachment is, thus, simple, may be very economically constructed, and is efficient in operation.

In the modification shown in Figs. 4 and 5, the end of the box-like tube A is opened and sloped at an angle of about forty-five degrees, and a valve B' is adapted to seat thereon. The parts for adjusting the valve are constructed, arranged, and operated in the same manner as those already described. As shown by dotted lines Fig. 4, the valve attachment may be swung laterally so as to leave the mouth of the conductor A' entirely open and free for admission of water.

Fig. 6 shows how a single solid bar F' may be used in place of the two bars F, in which case the screws G will pass directly through said bar.

What I claim is:

1. The improved apparatus for use in irrigation systems, comprising a tubular conductor having an opening in its side, a valve adapted to seat therein, and means for supporting and adjusting the same, comprising parallel supports attached to the conductor, and means connecting their upper ends and including a nut, a screw-shaft working in said nut and connected with the valve proper, substantially as described.

2. The improved apparatus for the purpose specified, comprising a tubular conductor having an opening for admission of water, a valve adapted to seat in and close said opening, and means for adjusting said valve higher or lower and swinging it laterally, comprising rods pivoted on the sides of the conductor, means for rigidly connecting their upper ends and including a nut, a screw shaft working in said nut and rotatably connected with the valve proper, whereby the valve may be adjusted higher or lower or swung laterally to further uncover the opening, substantially as described.

3. In an apparatus for the purpose specified, the combination, with a tube having an opening for admission of water, of a valve for controlling such opening, a screw-shaft rotatably connected therewith, rigid supports attached to the sides of the conductor and extending outward therefrom, means for rigidly connecting the upper ends of such supports, the same consisting of parallel bars, nuts attached to their central portions and clamps at their end portions, said bars being spaced apart to receive the supports, and the screw-shaft and nuts applied to the supports for securing the clamps to the bars, substantially as described.

4. In an apparatus for the purpose specified, the combination, with a tubular conductor, of a valve, swinging supports pivoted to the conductor and serving as guides for the valve proper, a rotatable screw-shaft connected with the latter, and means for rigidly connecting the upper ends of said supports, and including a nut in which the screw-shaft works, substantially as described.

JAKE LANG.

Witnesses:
C. L. CHAPMAN,
H. FULMER.